United States Patent
Nakamura et al.

(10) Patent No.: US 9,326,198 B2
(45) Date of Patent: Apr. 26, 2016

(54) COMMUNICATION SYSTEM, MOBILE STATION, AND SWITCHING CONTROL METHOD

(75) Inventors: Yuichiro Nakamura, Tokyo (JP); Kenichiro Aoyagi, Tokyo (JP); Hideyuki Matsutani, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 127 days.

(21) Appl. No.: 13/981,839

(22) PCT Filed: Jan. 16, 2012

(86) PCT No.: PCT/JP2012/050666
§ 371 (c)(1),
(2), (4) Date: Jul. 25, 2013

(87) PCT Pub. No.: WO2012/102106
PCT Pub. Date: Aug. 2, 2012

(65) Prior Publication Data
US 2013/0316711 A1 Nov. 28, 2013

(30) Foreign Application Priority Data
Jan. 27, 2011 (JP) ................ 2011-015735

(51) Int. Cl.
*H04W 36/00* (2009.01)
*H04W 76/02* (2009.01)

(52) U.S. Cl.
CPC ........ *H04W 36/0066* (2013.01); *H04W 76/027* (2013.01)

(58) Field of Classification Search
CPC ..... H04W 36/30; H04W 36/18; H04W 36/14; H04W 36/08; H04W 36/0083; H04W 24/10; H04W 36/0055; H04W 36/0088; H04W 72/042; H04W 16/14; H04W 72/04; H04W 72/0453; H04W 36/06; H04W 36/0061; H04W 36/0066; H04W 36/00; H04W 76/027
See application file for complete search history.

(56) References Cited

U.S. PATENT DOCUMENTS 7,957,352 B2 * 6/2011 Vanghi et al. ................. 370/335
8,547,939 B1 * 10/2013 Vargantwar .................. 370/333
(Continued)

FOREIGN PATENT DOCUMENTS

EP 2088794 A1 8/2009
EP 2134125 A2 12/2009
(Continued)

OTHER PUBLICATIONS

International Search Report issued in PCT/JP2012/050666 mailed on Apr. 10, 2012 (3 pages).
Written Opinion of the International Searching Authority issued in PCT/JP2012/050666 mailed on Apr. 10, 2012 (3 pages).
3GPP TS 25.331 V10.2.0; "3rd Generation Partnership Project; Technical Specification Group Radio Access Network; Radio Resource Control (RRC); Protocol specification (Release 10)"; Dec. 2010 (1835 pages).
(Continued)

*Primary Examiner* — Ajit Patel
(74) *Attorney, Agent, or Firm* — Osha Liang LLP (57) ABSTRACT

A UE 300 is connectable to a first radio communication system and a second radio communication system which differs from the first radio communication system and uses multiple frequency bands. The UE 300 receives RRC CONNECTION REJECT which gives an instruction to switch from the first radio communication system to the second radio communication system and an indication on multiple switching target frequencies included in the frequency bands used by the second radio communication system, and, if the multiple switching target frequencies include an unavailable frequency at which the UE 300 is incapable of transmission/reception, searches for only a cell of a switching target frequency among the multiple switching target frequencies exclusive of the unavailable frequency.

5 Claims, 5 Drawing Sheets

(56) References Cited

U.S. PATENT DOCUMENTS

| | | | |
|---|---|---|---|
| 2006/0178167 A1* | 8/2006 | Tamura et al. | 455/560 |
| 2006/0251012 A1* | 11/2006 | Hara et al. | 370/328 |
| 2011/0194427 A1* | 8/2011 | Shirota et al. | 370/252 |
| 2012/0083278 A1* | 4/2012 | Kazmi et al. | 455/440 |

FOREIGN PATENT DOCUMENTS

| | | |
|---|---|---|
| JP | 2005-260486 A | 9/2005 |
| JP | 2006-173701 A | 6/2006 |
| JP | 2006-253924 A | 9/2006 |
| JP | 2008-118204 A | 5/2008 |
| JP | 2009-296535 A | 12/2009 |

OTHER PUBLICATIONS

Office Action for corresponding Japanese Application No. 2011-015735, mailed Sep. 3, 2013 (5 pages).

Office Action for corresponding Mexico Application No. 2013-008638, mailed Apr. 25, 2014 (5 pages).

Office Action in counterpart Japanese Patent Application No. 2011-015735, mailed Jun. 3, 2014 (5 pages).

Office Action in counterpart Chinese Patent Application No. 201280006611.6 dated Aug. 27, 2015 (14 pages).

* cited by examiner

FIG. 3

# COMMUNICATION SYSTEM, MOBILE STATION, AND SWITCHING CONTROL METHOD

TECHNICAL FIELD

The present invention relates to a communication system including a communication control device and a mobile station which is connectable to multiple radio communication systems of different radio access technologies (RATS), a mobile station, and a switching control method.

BACKGROUND ART

Various methods of handover (Inter-RAT Handover) between multiple radio communication systems using different radio access technologies (RATs), such as a 3G (Wideband-CDMA) system (hereinafter 3G) and a Long Term Evolution system (hereinafter LTE), are specified for a mobile station connectable to the multiple radio communication systems (for example, Non-patent Document 1).

There is control called Redirection performed when a mobile station switches a radio communication system to which the mobile station is connected between such radio communication systems of different RATs. Redirection specifies a switching target radio communication system (RAT) and switching target frequencies. The mobile station searches for cells of the frequencies of the radio communication system thus specified, in accordance with the RAT used by the radio communication system.

During Redirection, a connection between the mobile station and a base station of a switching source radio communication system is in a disconnected state. Specifically, the mobile station first disconnects the connection to the switching source radio communication system, and then, establishes connection to the switching target radio communication system and issues a connection request to the radio communication system. For Redirection from 3G to LTE, in particular, the specification (RRC CONNECTION REJECT) of executing Redirection to LTE immediately in response to a communication start message (RRC CONNECTION REQUEST) is specified (see Chapter 8.1.3.9 of Non-patent Document 1).

According to the above specification, switching to LTE is executed before a core network acquires the capability of the mobile station such as a frequency band in which the mobile station is capable of communications. This enables prompt switching of a radio communication system.

PRIOR ART DOCUMENT

Non-Patent Document

Non-patent document 1: 3GPP TS 25.331, Technical Specification Group Radio Access Network; Radio Resource Control (RRC); Protocol specification Section 8.1.3.9 Reception of an RRC CONNECTION REJECT message by the UE

SUMMARY OF THE INVENTION

However, Redirection described above has the following problem. Specifically, since switching to LTE is executed without acquisition of the capability of the mobile station, the core network is uncertain as to whether or not the mobile station is compatible with frequency bands of the switching target radio communication system (for example, the 800 MHz band and the 2 GHz band).

For this reason, there may be a case where a communication control device provided to the core network, such as a RNC, erroneously designates an incompatible frequency at which the mobile station is incapable of transmitting/receiving radio signals in accordance with the RAT. In this case, the mobile station may try search also as to the incompatible frequency of the multiple frequencies thus specified. This increases a period for the mobile station to search for cells and increases connection delay associated with the switching of the radio communication system.

Thus, an objective of the present invention is to provide a communication system, a mobile station, and a switching control method capable of effectively reducing connection delay due to a cell search period in the case where switching to a radio communication system of different radio access technology (RAT) is executed without the capability of the mobile station being acquired by a core network.

A first aspect of the present invention is a communication system including: a mobile station (a UE 300) connectable to a first radio communication system (a 3G system 20) and a second radio communication system (a LTE system 10) which differs from the first radio communication system and uses multiple frequency bands; and a communication control device (a RNC 210) configured to control switching of the mobile station from the first radio communication system to the second radio communication system. In the communication system, the communication control device comprises a switching instruction transmission unit (a switching instruction transmission unit 215) configured to transmit the mobile station a switching instruction (RRC CONNECTION REJECT) which gives an instruction to switch from the first radio communication system to the second radio communication system and an indication on multiple switching target frequencies included in the frequency bands used by the second radio communication system, and the mobile station comprises a connection target cell processing unit configured to search for only a cell of a certain switching target frequency if the multiple switching target frequencies included in the switching instruction received from the communication control device include an unavailable frequency (the 800 MHz band, for example) at which the mobile station is incapable of transmission/reception, the certain switching target frequency included in the multiple switching target frequencies exclusive of the unavailable frequency.

A second aspect of the present invention is a mobile station connectable to a first radio communication system and a second radio communication system which differs from the first radio communication system and uses multiple frequency bands. The mobile station receives a switching instruction which gives an instruction to switch from the first radio communication system to the second radio communication system and an indication on multiple switching target frequencies included in the frequency bands used by the second radio communication system, and comprises a connection target cell processing unit configured to search for only a cell of a certain switching target frequency if the multiple switching target frequencies include an unavailable frequency at which the mobile station is incapable of transmission/reception, the certain switching target frequency included in the multiple switching target frequencies exclusive of the unavailable frequency.

In the second aspect of the present invention, if all the multiple switching target frequencies fall under the unavailable frequency, the connection target cell processing unit may search for a switching source cell of the first radio communication system without searching for cells of the multiple switching target frequencies.

In the second aspect of the present invention, if all the multiple switching target frequencies fall under the unavailable frequency, the connection target cell processing unit may search for all cells of frequency bands, in which the mobile station is capable of transmission/reception, without searching for cells of the multiple switching target frequencies.

A third aspect of the present invention is a communication control method of controlling switching of a mobile station from a first radio communication system to a second radio communication system which differs from the first radio communication system and uses multiple frequency bands, the mobile station connectable to the first radio communication system and the second radio communication system, the method comprising the steps of: causing a communication control device to transmit the mobile station a switching instruction which gives an instruction to switch from the first radio communication system to the second radio communication system and an indication on multiple switching target frequencies included in the frequency bands used by the second radio communication system; and causing the mobile station to search for only a cell of a certain switching target frequency if the multiple switching target frequencies included in the switching instruction received from the communication control device include an unavailable frequency at which the mobile station is incapable of transmission/ reception, the certain switching target frequency included in the multiple switching target frequencies exclusive of the unavailable frequency.

MODE FOR CARRYING OUT THE INVENTION

Next, an embodiment of the present invention is described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Radio Communication Network

Figure 1:
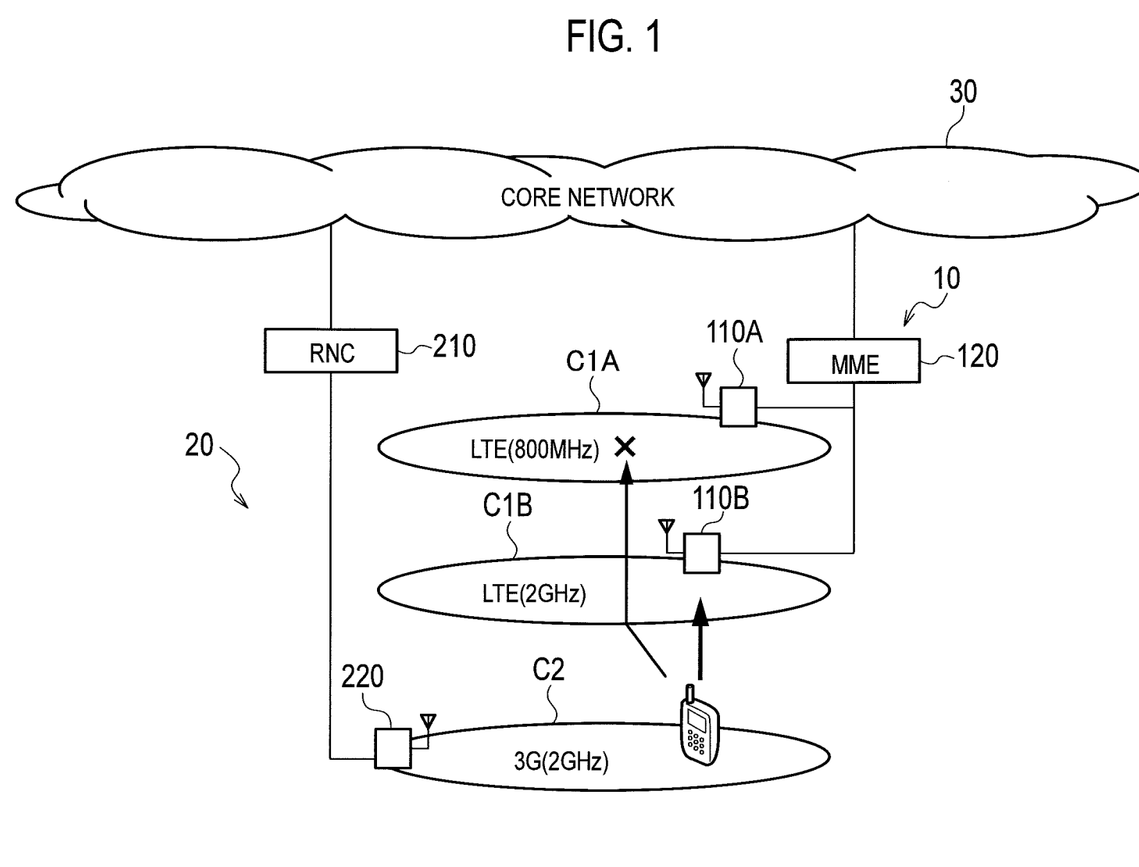
FIG. 1 is an overall schematic configuration diagram of a radio communication network including a communication system according to an embodiment of the present invention.

FIG. 1 is an overall schematic configuration diagram of a radio communication network including a communication system according to this embodiment. As shown in FIG. 1, the radio communication network according to this embodiment includes a LTE system 10 and a 3G system 20.

The LTE system 10 is a radio communication system compliant with the LTE standard. The 3G system 20 is a radio communication system compliant with the 3G standard (W-CDMA). That is, the LTE system 10 and the 3G system 20 use different radio access technologies (RATs). In this embodiment, the 3G system 20 constitutes a first radio communication system specified in the scope of claims, and the LTE system 10 constitutes a second radio communication system specified in the scope of claims.

A UE 300 (mobile station) is connectable to the LTE system 10 and the 3G system 20 by radio.

The LTE system 10 includes eNodeB110A and eNodeB110B which are base stations performing radio communications with the UE 300, and a MME 120 (Mobility Management Entity) which is configured to perform control over the eNodeB110A, the eNodeB110B, and the UE 300.

The 3G system 20 includes NodeB220 which is a base station performing radio communications with the UE 300, and a RNC 210 (Radio Network Controller) which is configured to perform control over the NodeB220 and the UE 300. In this embodiment, in particular, the RNC 210 controls switching of the UE 300 from the 3G system 20 to the LTE system 10. In this embodiment, the RNC 210 constitutes a communication control device specified in the scope of claims. Moreover, in this embodiment, the UE 300 and the RNC 210 constitute a communication system specified in the scope of claims.

The devices constituting the LTE system 10 and the 3G system 20 are communicatively connected to one another via a core network 30.

The eNodeB110A forms a cell C1A compliant with the LTE standard. The cell C1A is formed using a radio frequency of 800 MHz band. Likewise, the eNodeB110B forms a cell C1B compliant with the LTE standard. The cell C1B is formed using a radio frequency of 2 GHz band.

The NodeB220 forms a cell C2 compliant with the 3G standard. The cell C2 is formed using a radio frequency of 2 GHz band.

As described above, the UE 300 is connectable to the LTE system 10 and the 3G system 20 by radio. However, the UE 300 is capable of performing communications only at radio frequencies of 2 GHz band in areas of the LTE standard.

(2) Functional Block Configuration of Communication System

Figure 2:
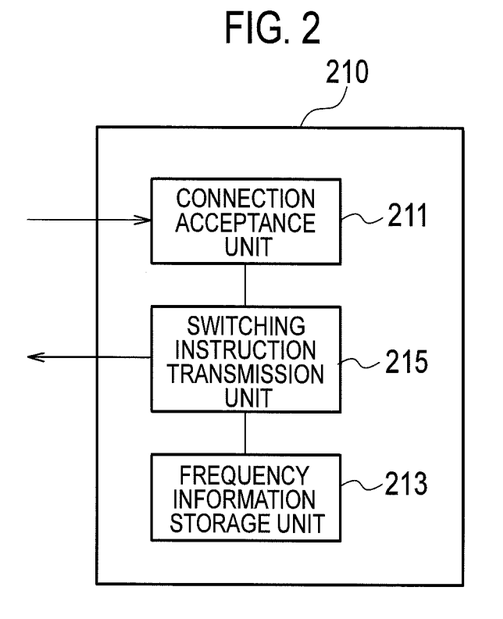
FIG. 2 is a functional block configuration diagram of a RNC 210 according to the embodiment of the present invention.
Figure 3:
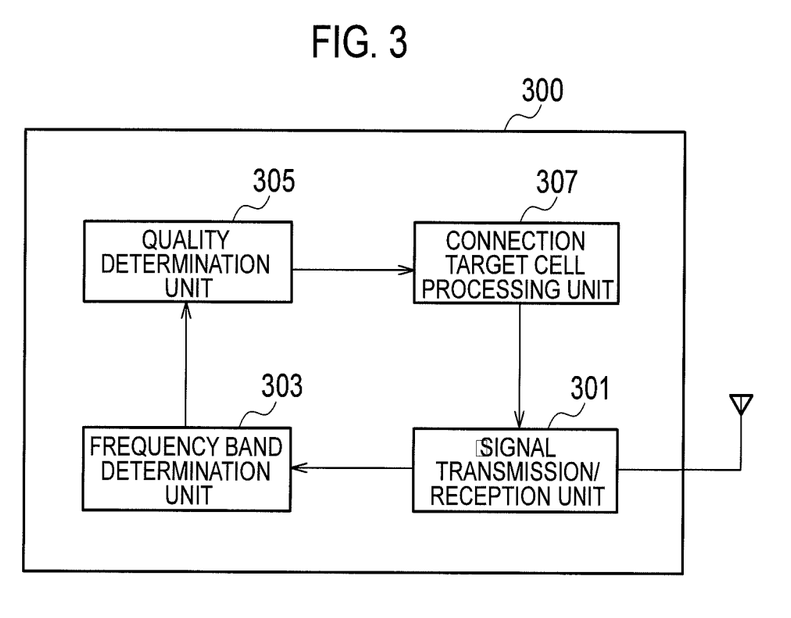
FIG. 3 is a functional block configuration diagram of a UE 300 according to the embodiment of the present invention.

Next, description is given of the functional block configurations of the RNC 210 and the UE 300 constituting the communication system in this embodiment. FIG. 2 is a functional block configuration diagram of the RNC 210. FIG. 3 is a functional block configuration diagram of the UE 300.

(2.1) RNC 210

As shown in FIG. 2, the RNC 210 includes a connection acceptance unit 211, a frequency information storage unit 213, and a switching instruction transmission unit 215.

The connection acceptance unit 211 is configured to accept connection to the 3G system 20 from the UE 300. Specifically, the connection acceptance unit 211 receives RRC CONNECTION REQUEST compliant with the Radio Resource Control (RRC) protocol, from the UE 300 via the NodeB220.

The frequency information storage unit 213 is configured to store information on neighboring cells (cells C1A, C1B) of the cell C2 formed by the NodeB220. Specifically, the frequency information storage unit 213 stores the types (3G/LTE) of radio access technology (RAT) used in the neighboring cells, and frequency bands (800 MHz band/2 GHz band) used in the neighboring cells. Here, the information stored by the frequency information storage unit 213 may be acquired from the LTE system 10 via the core network 30 when needed.

The switching instruction transmission unit 215 is configured to transmit the UE 300 a switching instruction to switch a radio communication system to which the UE 300 is connected. Specifically, as the switching instruction, the switching instruction transmission unit 215 transmits the UE 300 RRC CONNECTION REJECT compliant with the Radio Resource Control (RRC) protocol. The switching instruction transmission unit 215 transmits RRC CONNECTION REJECT to the UE 300 without acquiring the capability of the UE 300, specifically, without acquiring a frequency band in which the UE 300 is capable of transmission/reception.

In RRC CONNECTION REJECT according to this embodiment, frequencies of the LTE cells are set as a switching target radio communication system, specifically, as a Redirection target. More specifically, RRC CONNECTION REJECT includes information indicating frequencies of the cell C1A (800 MHz band) and the cell C1B (2 GHz band). Here, the information indicating the frequencies can be indicated using the information element (IE) "Inter-RAT Info" under the "Redirection info", for example.

In other words, RRC CONNECTION REJECT can give the UE 300 an instruction to switch from the 3G system 20 to the LTE system 10 and an indication on multiple switching target frequencies included in the frequency bands (800 MHz/2 GHz) used in the LTE system 10. Here, the multiple switching target frequencies denote frequencies of required communication channels in the 800 MHz band and frequencies of required communication channels in the 2 GHz band.

(2.2) UE 300

As shown in FIG. 3, the UE 300 includes a signal transmission/reception unit 301, a frequency band determination unit 303, a quality determination unit 305, and a connection target cell processing unit 307.

The signal transmission/reception unit 301 is configured to transmit/receive predetermined signals to/from the LTE system 10 or the 3G system 20. In this embodiment, in particular, the signal transmission/reception unit 301 transmits RRC CONNECTION REQUEST to the RNC 210 and receives RRC CONNECTION REJECT (switching instruction) from the RNC 210.

The frequency band determination unit 303 is configured to determine frequency bands of a Redirection target radio communication system (RAT) indicated in RRC CONNECTION REJECT. The frequency band determination unit 303 is also configured to pick out only frequencies of the frequency band (2 GHz band) in which the UE 300 is capable of transmission/reception, out of the frequency band thus determined.

The quality determination unit 305 is configured to search for only cells of the frequencies that are picked out by the frequency band determination unit 303 and included in the frequency band in which the UE 300 is capable of transmission/reception, and determine reception quality of radio signals from the cells. The quality determination unit 305 notifies the connection target cell processing unit 307 of information on cells satisfying a predetermined reception quality threshold.

The connection target cell processing unit 307 is configured to decide a cell to which the UE 300 is to be connected, out of the cells notified by the quality determination unit 305. Specifically, based on the multiple switching target frequencies included in RRC CONNECTION REJECT and the frequency band in which the UE 300 is capable of transmission/reception, the connection target cell processing unit 307 determines whether or not the switching target frequencies include unavailable frequencies (800 MHz band) at which the UE 300 is incapable of transmission/reception. If the multiple switching target frequencies include the unavailable frequencies, the connection target cell processing unit 307 searches for only cells of switching target frequencies (2 GHz band) among the multiple switching target frequencies exclusive of the unavailable frequencies.

For example, in the case where the multiple switching target frequencies include 800.aaa MHz, 800.bbb MHz, 2000.ccc MHz, and 2000.ddd MHz, the connection target cell processing unit 307 excludes 800.aaa MHz and 800.bbb MHz at which the UE 300 is incapable of transmission/reception, and searches for only cells of 2000.ccc MHz and 2000.ddd MHz.

(3) Operation of Communication System

Figure 4:
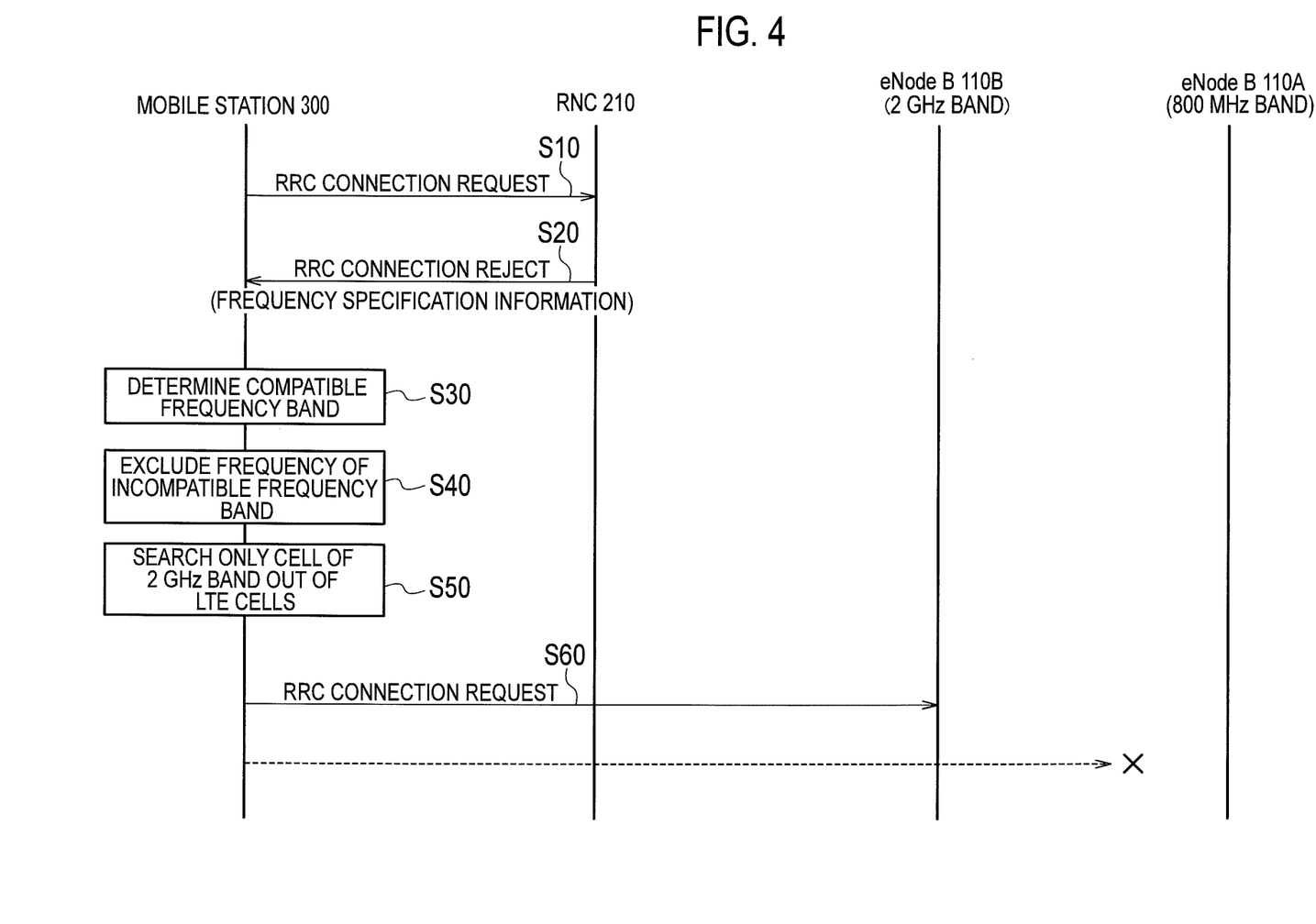
FIG. 4 is a diagram showing a sequence of switching a radio communication system to be executed mainly between the RNC 210 and the UE 300.

Next, an operation of the communication system described above is described with reference to FIG. 4. FIG. 4 shows a sequence of switching a radio communication system to be executed mainly between the RNC 210 and the UE 300.

In this embodiment, the UE 300 exists in the cell C2 of the 3G system 20 and executes switching from the 3G system 20 to the LTE system 10.

The UE 300 transmits the RNC 210 RRC CONNECTION REQUEST requesting a connection to the 3G system 20 (Step S10).

The RNC 210 having received RRC CONNECTION REQUEST decides to let the UE 300 execute Redirection to the LTE system 10, and transmits the UE 300 RRC CONNECTION REJECT being a message for letting the UE 300 executing Redirection (Step S20). The RNC 210 transmits RRC CONNECTION REJECT before acquiring the capability of the UE 300, specifically, before acquiring a frequency band in which the UE 300 is capable of transmission/reception.

Note that factors by which the RNC 210 decides to let the UE 300 execute Redirection to the LTE system 10 include the traffic congestion status in the 3G system 20 and the types of service provided by the LTE system 10 and the 3G system 20.

In RRC CONNECTION REJECT, the frequencies of the cells (the cells C1A and C1B) in the LTE system 10 are set as a Redirection target. In this embodiment, the frequencies in the 800 MHz band and the 2 GHz band are set.

The UE 300 having received RRC CONNECTION REJECT determines a frequency band with which the UE 300 is compatible, specifically, a frequency band in which the UE 300 is capable of transmission/reception, on the basis of the frequency information included in RRC CONNECTION REJECT (Step S30).

The UE 300 excludes frequencies of the frequency band with which the UE 300 is incompatible (the 800 MHz band in LTE) (Step S40), and searches for only the cell (the cell C1B) of the frequency of the frequency band with which the UE 300 is compatible (the 2 GHz band in LTE) (Step S50). In other words, the UE 300 does not search for the cell (the cell C1A) of the frequency of the excluded frequency band (the 800 MHz band in LTE).

The UE 300 transmits RRC CONNECTION REQUEST to the eNodeB110B forming the cell C1B detected by the cell search (Step S60).

Figure 5:
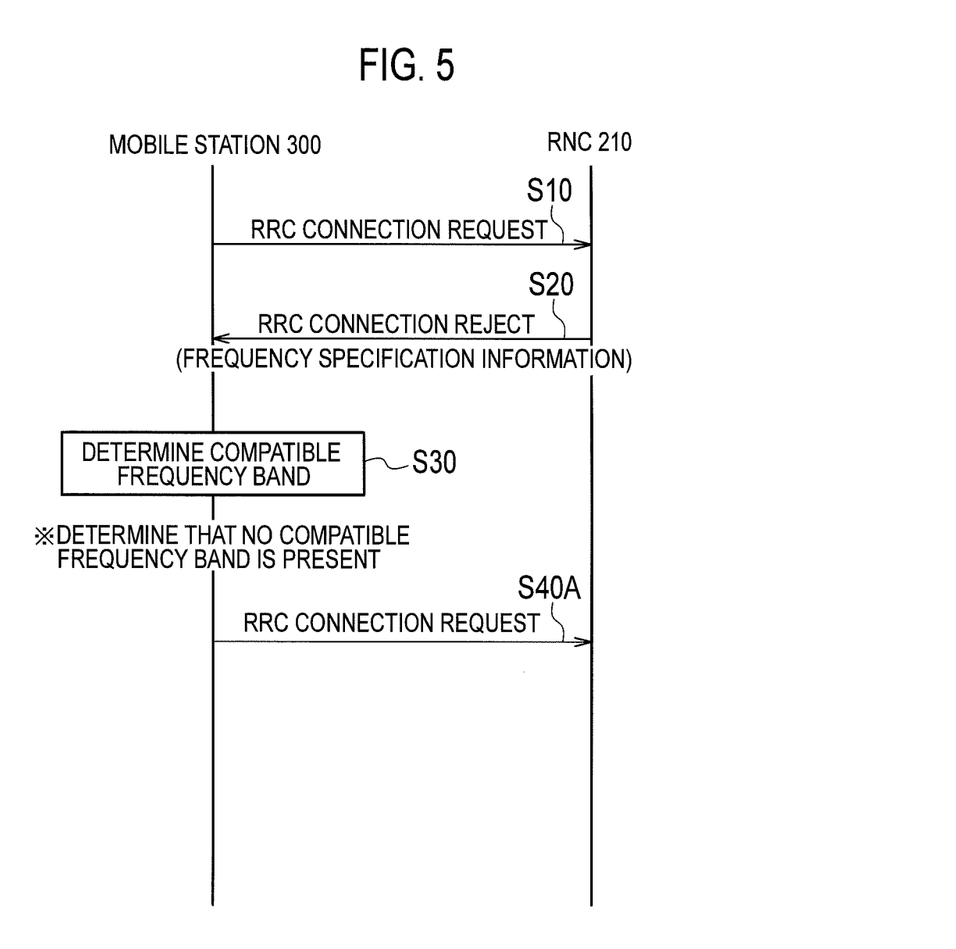
FIG. 5 is a diagram showing a cell search method performed by the UE 300 according to a modified example of the present invention (modified example 1).
Figure 6:
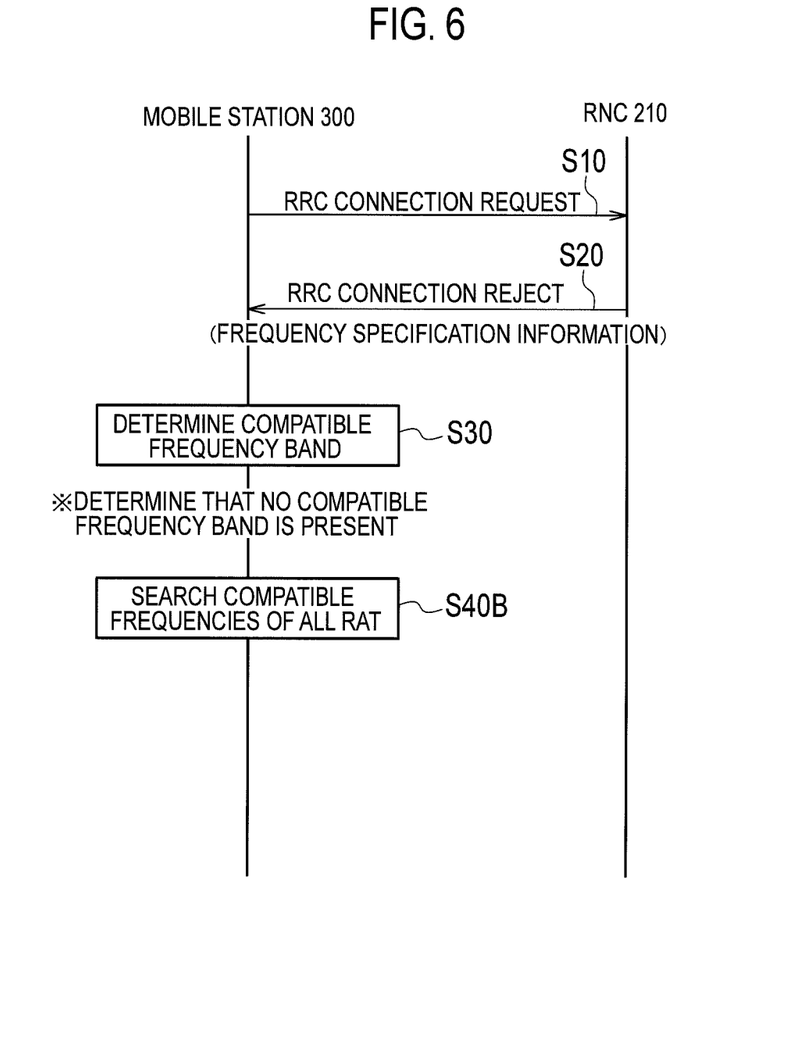
FIG. 6 is a diagram showing a cell search method performed by the UE 300 according to another modified example of the present invention (modified example 2).

Next, with reference to FIGS. 5 and 6, description is given of modified examples of a cell search method performed by the UE 300. FIGS. 5 and 6 show operations performed by the UE when no frequency band in which the UE 300 is capable of transmission/reception is present in Step S30 as a result of execution of the sequence in Steps S10 to S30 described above.

(4.1) Modified Example 1

As shown in FIG. 5, if no frequency band in which the UE 300 is capable of transmission/reception is present, i.e., if all the switching target frequencies are unavailable frequencies, the UE 300 (the connection target cell processing unit 307) does not search for the cells of the switching target frequencies but searches for the switching source cell of the 3G system 20 (the cell C2) (Step S40A).

Specifically, if all the switching target frequencies are unavailable frequencies, the UE 300 may transmit RRC CONNECTION REQUEST to the cell of the 3G system 20 again without searching for the cell of the LTE system 10.

(4.2) Modified Example 2

As shown in FIG. 6, if no frequency band in which the UE 300 is capable of transmission/reception is present, the UE 300 (the connection target cell processing unit 307) does not search for the cells of the switching target frequencies but searches for all cells of frequency bands with which the UE 300 is compatible, i.e., in which the UE 300 is capable of transmission/reception (Step S403).

Note that the UE 300 may search for cells of all frequency bands not of a certain radio communication system (RAT) but of both the LTE system 10 and the 3G system 20, in which the UE 300 is capable of transmission/reception.

(5) Operation and Effect

According to the communication system of this embodiment described above, when RRC CONNECTION REJECT (switching instruction) that the UE 300 has received from the RNC 210 includes a frequency of a frequency band in which the UE 300 is incapable of transmission/reception (unavailable frequency), the UE 300 searches for only cells of switching target frequencies among the switching target frequencies exclusive of the unavailable frequency.

Accordingly, even when the RNC 210 or the like transmits RRC CONNECTION REJECT to the UE 300 before acquiring the capability of the UE 300 (a frequency band in which the UE 300 is capable of transmission/reception), an operation for the UE 300 to try to search for a cell of the unavailable frequency is avoided. This effectively reduces connection delay due to a period for the UE 300 to search for cells.

In addition, as in the modified examples 1 and 2 described above, even when all the switching target frequencies specified in RRC CONNECTION REJECT are frequencies of a frequency band in which the UE 300 is incapable of transmission/reception (unavailable frequencies), the UE 300 may search for the switching source cell of the 3G system 20 (the cell C2), or alternatively, may search for all the cells of the frequency bands in which the UE is capable of transmission/reception (the cells C1B and C2). Accordingly, the connectivity with a switching target radio communication system can be improved even in the case of using RRC CONNECTION REJECT.

(6) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, although switching from the 3G system 20 to the LTE system 10 is described as an example in the above embodiment, the same processes may be executed for switching from the LTE system 10 to the 3G system 20.

Although 3G and LTE are described as examples of the radio access technology (RAT) in the above embodiment, another RAT (such as cdma2000 and GERAN) may be used.

Although the above embodiment is the mode where the RNC 210 transmits RRC CONNECTION REJECT (switching instruction) to the UE 300, the eNodeB110B (110A) or the MME 120 instead of the RNC 210 may transmit the UE 300 information equivalent to RRC CONNECTION REJECT.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2011-015735 (filed on Jan. 27, 2011) is incorporated herein by reference.

INDUSTRIAL APPLICABILITY

According to the aspects of the present invention, it is possible to provide a communication system, a mobile station, and a switching control method capable of effectively reducing connection delay due to a cell search period in the case where switching to a radio communication system of different radio access technology (RAT) is executed without the capability of the mobile station being acquired by a core network.

EXPLANATION OF THE REFERENCE NUMERALS

10 LTE system
20 3G system
30 core network
110A, 110B eNodeB
120 MME
210 RNC
211 connection acceptance unit
213 frequency information storage unit
215 switching instruction transmission unit
220 NodeB
300 UE
301 signal transmission/reception unit
303 frequency band determination unit
305 quality determination unit
307 connection target cell processing unit
C1A, C1B, C2 cell

The invention claimed is:

1. A communication system including:
a mobile station connectable to a first radio communication system and a second radio communication system which uses a different radio access technology from the first radio communication system and uses a plurality of frequency bands; and
a communication control device configured to control switching of the mobile station from the first radio communication system to the second radio communication system, wherein
the communication control device comprises a switching instruction transmission unit configured to transmit to the mobile station a switching instruction which gives an instruction to switch from the first radio communication system to the second radio communication system and an indication on a plurality of switching target frequencies included in the plurality of frequency bands used by the second radio communication system,
wherein the switching instruction transmission unit transmits the switching instruction in response to a connection request from the mobile station before acquisition of information relating to a frequency band which is capable of transmission/reception by the mobile station, and
the mobile station comprises:
a frequency band determination unit configured to determine frequency bands of the second radio communication system, which is redirection target, indicated in the switching instruction;
a frequency selection unit configured to pick out only frequencies of the frequency band in which the mobile station is capable of transmission/reception, out of the frequency band thus determined; and
a quality determination unit configured to search only for cells using the frequency included in the frequency band picked out by the frequency determination unit, to determine a reception quality of a radio signal from the cells, and to determine cells satisfying a prescribed reception quality threshold, and
a connection target cell processing unit configured to determine a cell for connection with the mobile station among the cells satisfying the prescribed reception quality threshold.

2. A mobile station connectable to a first radio communication system and a second radio communication system which uses a different radio access technology from the first radio communication system and uses a plurality of frequency bands,
the mobile station being configured to receive a switching instruction which gives an instruction to switch from the first radio communication system to the second radio communication system and an indication on a plurality of switching target frequencies included in the plurality of frequency bands used by the second radio communication system,
wherein the mobile station receives the switching instruction in response to a connection request from the mobile station before an external communication control device acquires information relating to a frequency band which is capable of transmission/reception by the mobile station,
and comprising:
a frequency band determination unit configured to determine frequency bands of the second radio communication system, which is redirection target, indicated in the switching instruction;
a frequency selection unit configured to pick out only frequencies of the frequency band in which the mobile station is capable of transmission/reception, out of the frequency band thus determined;
a quality determination unit configured to search only for cells using the frequency included in the frequency band picked out by the frequency determination unit, to determine a reception quality of a radio signal from the cells, and to determine cells satisfying a prescribed reception quality threshold; and
a connection target cell processing unit configured to determine a cell for connection with the mobile station among the cells satisfying the prescribed reception quality threshold.

3. The mobile station according to claim 2, wherein, if all the plurality of switching target frequencies fall under a frequency band which is incapable of transmission/reception by the mobile station, the connection target cell processing unit searches for a switching source cell of the first radio communication system without searching for cells of the plurality of switching target frequencies.

4. The mobile station according to claim 2, wherein, if all the plurality of switching target frequencies fall under a frequency band which is incapable of transmission/reception by the mobile station, the connection target cell processing unit searches for all cells of frequency bands, in which the mobile station is capable of transmission/reception, without searching for cells of the plurality of switching target frequencies.

5. A communication control method of controlling switching of a mobile station from a first radio communication system to a second radio communication system which uses a different radio access technology from the first radio communication system and uses a plurality of frequency bands, the mobile station connectable to the first radio communication system and the second radio communication system, the method comprising the steps of:
causing a communication control device to transmit to the mobile station a switching instruction which gives an instruction to switch from the first radio communication system to the second radio communication system and an indication on a plurality of switching target frequencies included in the plurality of frequency bands used by the second radio communication system,
wherein the communication control device transmits the switching instruction in response to a connection request from the mobile station before acquisition of information relating to a frequency band which is capable of transmission/reception by the mobile station;
causing the mobile station to determine frequency bands of the second radio communication system, which is redirection target, indicated in the switching instruction, and to pick out only frequencies of the frequency band in which the mobile station is capable of transmission/reception, out of the frequency band thus determined; and
causing the mobile station to search for only a cell of a certain switching target frequency if the plurality of switching target frequencies included in the switching instruction received from the communication control device include an unavailable frequency at which the mobile station is incapable of transmission/reception, the certain switching target frequency included in the plurality of switching target frequencies exclusive of the unavailable frequency,
wherein in the step of causing the mobile station to search, to search only for cells using the frequency included in the frequency band picked out by the mobile station, to determine a reception quality of a radio signal from the cells, and to determine a cell for connection with the mobile station among cells satisfying a prescribed reception quality threshold.

* * * * *